Dec. 7, 1965 M. MACCHINI 3,222,143
UNIVERSAL JOINT YOKES
Original Filed May 31, 1961 5 Sheets-Sheet 1

Inventor:
Mario Macchini,
by *Tho. R. Lamy* Atty.

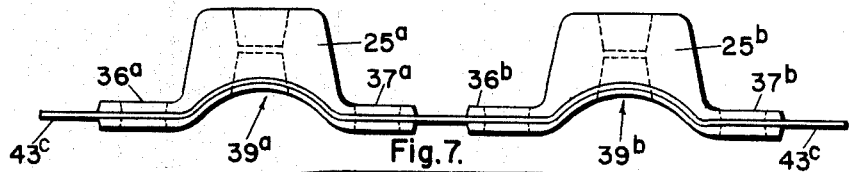
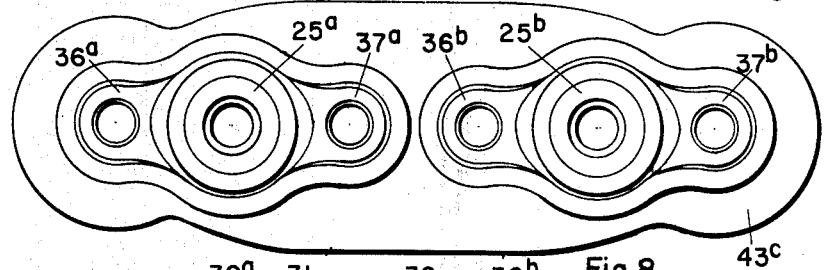
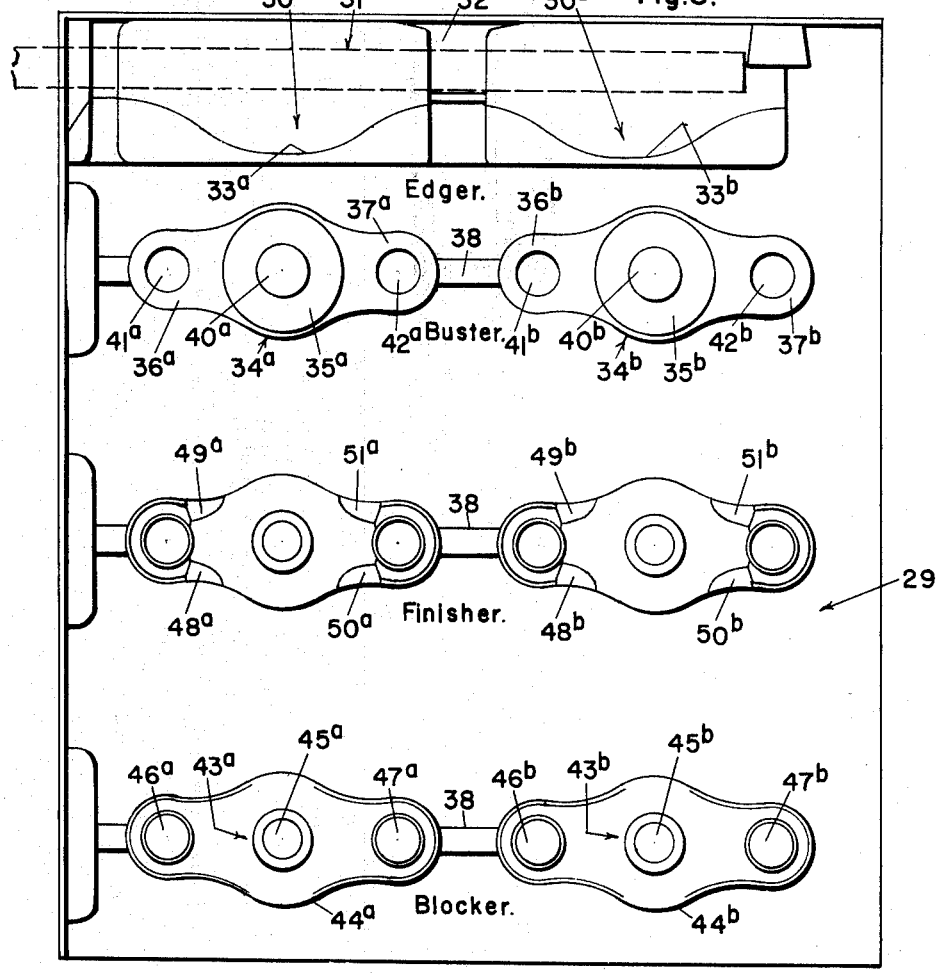

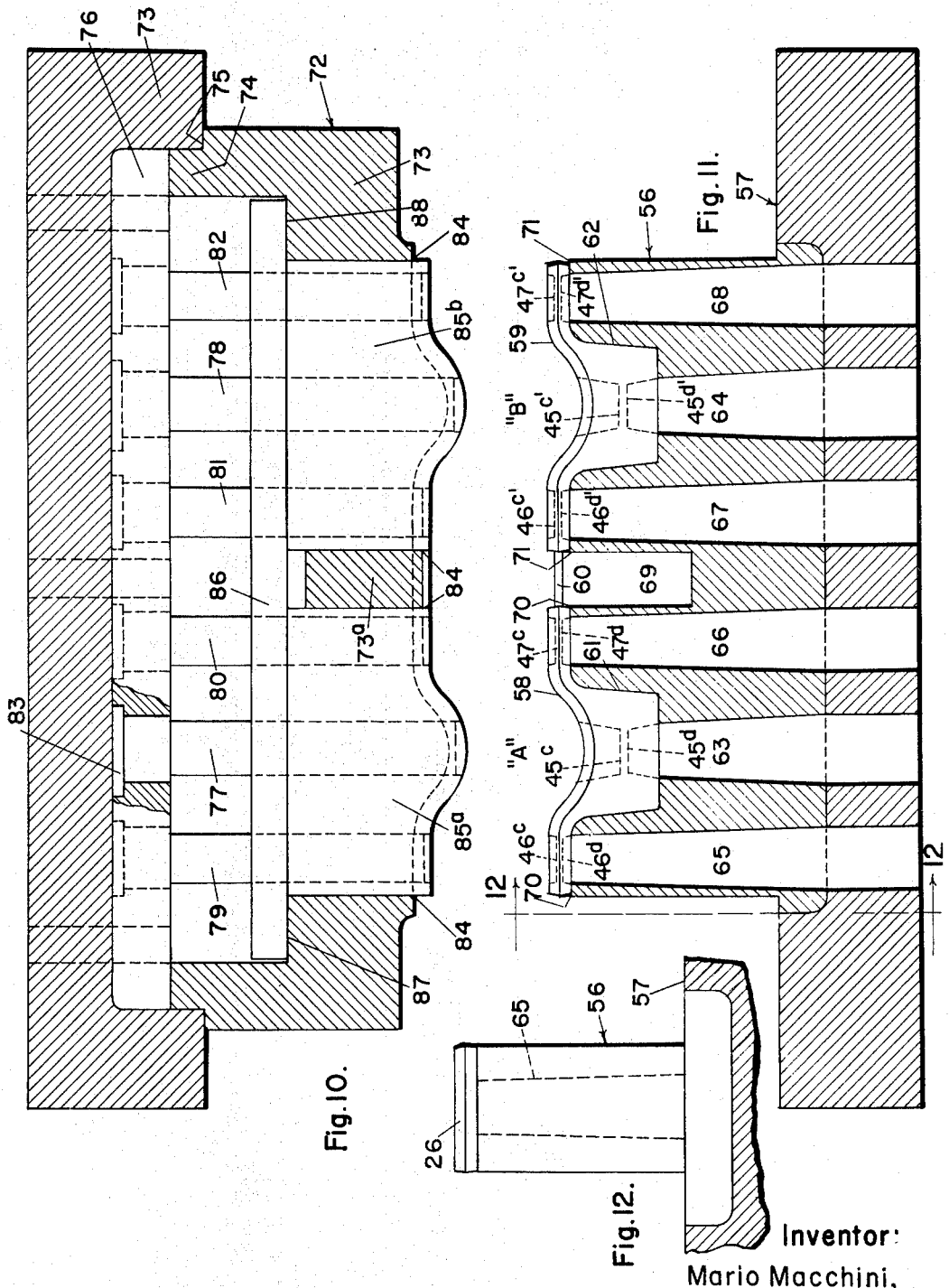

Inventor:
Mario Macchini,
by [signature] Atty.

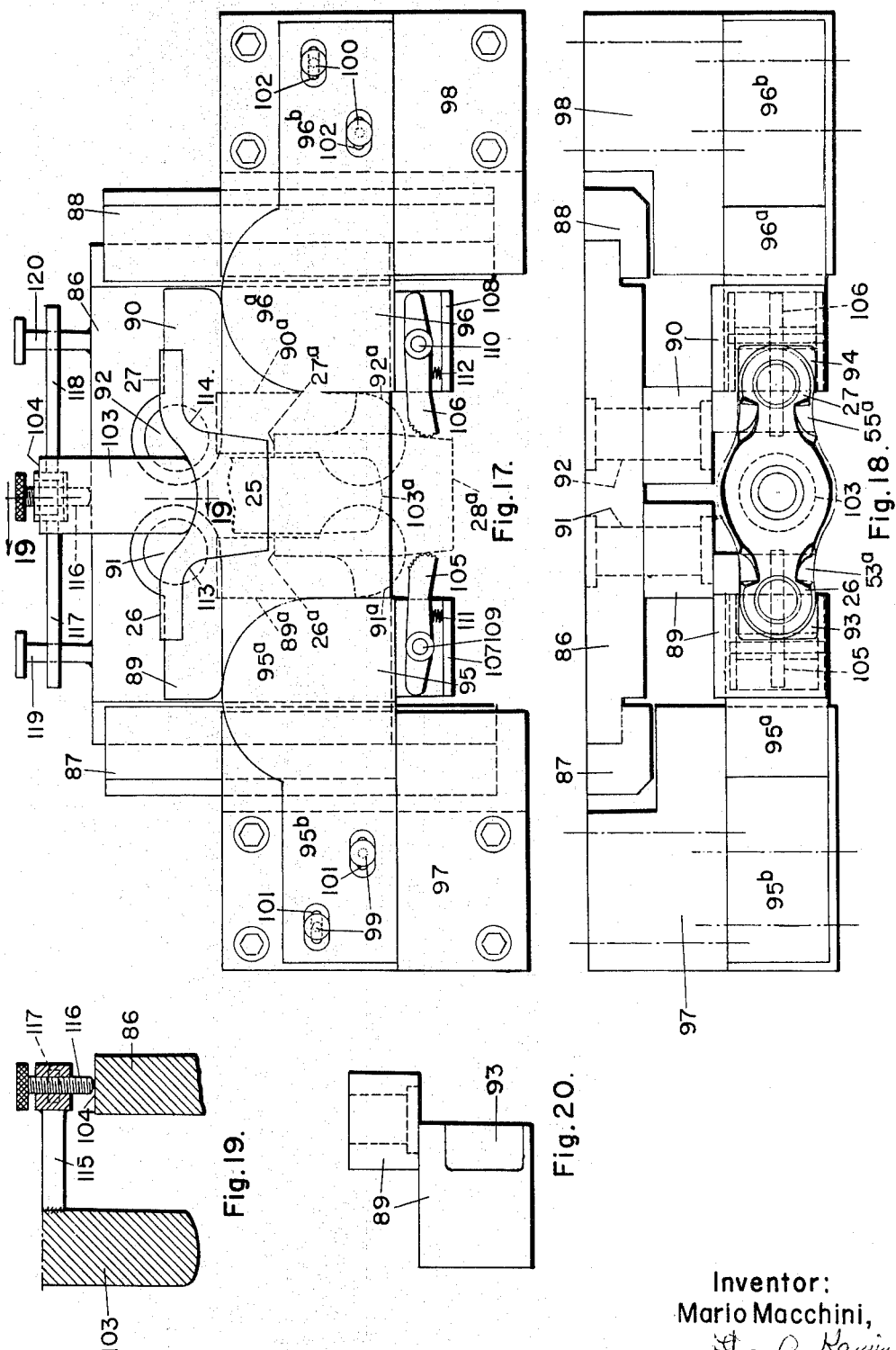

Patented Dec. 7, 1965

1

**3,222,143
UNIVERSAL JOINT YOKES**
Mario Macchini, 281 Shenstone Road, Riverside, Ill.
Original application May 31, 1961, Ser. No. 124,252, now Patent No. 3,124,877, dated Mar. 17, 1964. Divided and this application Feb. 17, 1964, Ser. No. 345,471
3 Claims. (Cl. 29—183)

This is a division of application Serial No. 124,252, filed May 31, 1961, now Patent No. 3,124,877, granted on March 17, 1964.

This invention relates to improvements in forging universal joint yokes, and the like. The term "universal joint yokes" as herein used refers to one of the two units which comprise the portion of a universal joint which are individually connected to the driving and driven shafts connected together by such universal joint; and which yoke elements are connected together by the gimbal unit which is pivotally connected to both such yokes on pivotal axes which intersect but extend at right angles to each other. Various designs and constructions of the gimbal units have been conventionally used in such universal joints; and the present invention does not concern itself with such gimbal units, except insofar as the yoke units to which the present invention relates are of design, and of proportions acceptable for use with the gimbal units specified for such use. Included in such requirements are the following;

The universal joints are generally used for connecting together shafts which are not in alignment with each other so that the axes of the two yokes connected to the proximate ends of such shafts are also non-aligned according to the non-alignment of the connected shafts. Accordingly, during rotation of the shafts and the yokes the latter must be of such design and be so proportioned that their structural elements will not interfere with each other during such rotations. The yokes herein disclosed comply with this requirement in a highly successful manner for all usually encountered conditions of non-alignment of the shafts.

The axes of the gimbal unit pivotal connections to the two yokes, previously referred to, must extend at right angles to the axes of the respective shafts to which such yokes are connected. That is to say, the gimbal axis of connection of yoke $Y_1$ for shaft $S_1$ must extend at right-angles to the axis of such shaft $S_1$; and likewise, the gimbal axis of connection to yoke $Y_2$ for shaft $S_2$ must extend at right-angles to the axis of such shaft $S_2$. Conventionally, the hub of each yoke is provided with a socket or shaft receiving hole with suitable provision for locking the yoke hub and such shaft together for rigid drive between such parts. Accordingly, the socket or hole provided in such yoke hub must be formed for accurate alignment of the yoke and hub with the shaft, in such manner that the gimbal axis of the connection of the gimbal to such yoke shall be at right-angles to the shaft axis of the shaft connection to such yoke. Furthermore, the two yokes of the universal joint must be accurately produced so that when the gimbal is assembled to both such yokes, the two shaft axes will intersect each other at the center point of the assembly. This latter requirement will be met by specifying that the gimbal axis of connection to each yoke must lie in a plane which includes the shaft to which such yoke is connected, and, lying in such plane, must also extend at right-angles to the shaft axis.

Further exploration of the foregoing relationships will reveal the following conditions of accuracy of manufacture of the yokes in order that such specified relationships may be attained. The gimbal axis bearings of such yoke must lie in alignment with each other; such bearings must be produced to receive the gimbal axis at right-angles to the axis of the shaft (when such shaft is connected to such yoke), so that such gimbal axis bearings of such yoke lie in the plane which includes the shaft axis, with the shaft axis and the axis of the gimbal connection to the yoke of such shaft, at right-angles to each other.

When, according to conventional manufacturing practice the yoke is produced by a forging operation different from that herein to be disclosed, with the yoke ears thus basically formed in direction parallel to the hub, it is necessary to drill and/or bore the gimbal receiving holes in the two yoke arms as a distinct machining operation; and under such conditions of working up a forging into the finished yoke, it is also necessary to drill and/or bore the shaft receiving opening in the hub. In absence of provision of special tool machines for drilling and/or boring all the aforesaid holes simultaneously, it is evident that considerable care and time must be consumed in setting up the yoke made by such previous forging operation, to ensure that all of the holes shall be produced to meet the aforestated specification. Accordingly, the cost of production of yokes thus made is high, due both to excessive labor time, and also to increased capital investment needed to produce a specified daily output of the finished yokes. I shall also show that my presently to be disclosed process ensures production of grain conditions especially adapted to meet the yoke requirements.

The features of the presently to be disclosed process and product are primarily intended for use or incorporation in yokes of universal joints transmitting considerable or large torques between the driving and driven shafts. Such torques are transmitted between the hub of each yoke and the two spaced apart ears of such yoke, which ears receive the corresponding axis of the gimbal unit. Thus severe twisting forces are developed between the yoke hub and the ears of the yoke; and failures frequently appear at the locations of connections of the ears to the yoke hub. Such failures first evidence themselves by the development of cracks at the locations in question.

The prevention of such failures as above mentioned in conventionally produced forged yoke units requires either the provision of excessive material at the critical locations, to carry the torque forces, or the use of higher grades of steel or other material for manufacture of the yokes; or, in some cases, the use of special steels combined with special heat treatment and normalizing processes to relieve internal stress. It is thus evident that additional expenses and cost of production are incurred, due to the stated conditions, when the yokes are produced by conventional forging with the arms parallel to the hub, as a basic part of the operation.

The prime object of the present invention is to provide a novel and practical method of producing the yokes by a basic forging operation including several steps of operations produced in such sequence that the originally forged unit is brought into the completed and substantially finished product without machining or like finishing operations other, in some cases, than a reaming or like surface finishing operation produced on the shaft and gimbal receiving holes which holes are produced during the steps of operation hereinafter to be disclosed. In many cases even such simple reaming operations will be found to be unnecessary since the several steps of operations bring the unit into a state of completion within conventional and acceptable tolerances as respects the aforesaid holes.

According to the method or process of forging and subsequent treatment hereinafter disclosed in detail, the body of raw material, generally in the form of a length of bar steel, and at forging temperature of approximately 2200–2300 degrees F., is first subjected to several hot forging blows in a die of proper form to produce an enlarged portion more or less centrally of such stock, and from which the hub portion will, at least in part, be subsequently formed. Next, such so treated stock is shifted to a forging die which is provided with a recess or sink of depth and contour to roughly produce the hub portion of the unit. Here the stock, still at hot forging temperature, is subjected to several blows to bust the material fully into such sink for production of the roughly formed hub. The dies at this location are also so formed as to produce a rounded surface on the stock at each side of the sink, rounded concave away from the hub so produced; and the stock at positions opposite to each other is also formed into roughly contoured ears, which ears are also formed on a rounded contour as a continuation of the above concavely rounded surface of the portion, but now rounded away from the hub portion on an opposite or convex curvature. During this operation the dies also produce aligned deep recesses in the top and bottom portions of the hub, roughly corresponding in position and size to the shaft opening to be later completed through such hub; and also such forging dies produce, during this operation, top and bottom aligned recesses in the ears roughly corresponding to the openings to be completed through such ears for reception of the gimbal shaft or its bearings, in the to be completed unit. These operations are all hot produced at the stage of the forging dies hereafter referred to as the "Buster" stage or position.

The stock, still at hot forging temperature, is next moved to a hot forging position hereinafter referred to as the "Blocker" stage or position. During such transfer the stock is reversed, or turned up side down, so that its previously roughed out hub portion now extends upwardly, with the oppositely located ear portions lying against the lower die. In this position the hammer die is provided with a recess or sink to receive the previously roughed out hub portion, and both the lower or stationary die and the upper or hammer die are formed to bring the unit into a more perfected form, including its hub portion, and the forms of its ears; and including the improvement of the deep recesses produced in the top and bottom of the hub and the recesses produced in the two ears, at which locations the subsequent piercing operations will be produced prior to bending the two ears into their final positions, parallel to the hub portion. The importance of all of the recesses, especially those deep recesses forged into the top and bottom portions of the hub will become apparent from later considerations of the formation of the through openings in the ears and the hub by piercing operations instead of drilling operations. Said hub recesses also affect the strength of the yoke for transfer of torque when embodied in a universal joint, as will be disclosed hereinafter. At this "Blocker" position both the lower stationary die and the upper or hammer die are so formed as to produce a doubly bevelled edge around the unit, with excess material extended outwardly from such bevelled edge in the form of a thin flange of material to be subsequently trimmed off as scrap. Several blows are delivered by the hammer die to the work body still hot at forging temperature, at this stage.

The stock is next shifted to a "Finisher" stage of the forging operations. At this stage the work body, still hot at forging temperature is in the same inverted position as it occupied at the "Blocker" stage. That is, the lower stationary die is formed to produce a final forging finish to the bottom surface of the unit (which will in fact, become the top surface of the finally finished unit): and the upper or hammer die is formed to produce a finishing of the outside surfaces of the hub and top (afterwards, bottom) surfaces of the ears. Also, in this "Finisher" stage the recesses in the top and bottom of the hub and in the top and bottom of the ears, are forge finished to a high degree of accuracy of position so that the subsequent "Piercing" operations may be accurately positioned, as hereinafter explained and without need of piercing more than a thin web of the hot forged unit in the hub and in each of the ears. At this stage the work body is brought into its final hot forged form ready to be transferred at a "Trimmer" stage in which the excess stock is trimmed off from the outer edges of the unit; and in this "Trimmer" stage suitable dies are used to pierce through the recesses formed in the hub portion and in the ears, to bring such recesses into the condition of accurately located through holes or perforations to receive the shaft into the hub and to receive into the ears, the bearings of the gimbal axis which corresponds to such yoke unit. It is now noted that such ears still extend laterally outward from the hub portion, so that in this stage both such ear perforations and the hub perforation may be pierced by male die elements all moving in direction parallel to the axis of the hub portion.

In this "Trimmer" stage the excess stock is also trimmed off from the unit, leaving the entire perimeter of such unit clean cut as desired in the finally to be produced unit. It is also noted that, for reasons of economy in operations and otherwise, all of the previously described operations have been performed on a section of stock of double length, so that each of the forging operations is actually produced doubly, that is, two of the yoke units are simultaneously being produced by each of the operations before explained; but in the final or "Trimming" operation both of such units are simultaneously released from the common scrap material which surrounded both of them, and thus two of such units are completed to such trimming stage, ready for the final and bending operation now to be explained;

In such bending operation each of the thus far completed forged units is individually subjected to a bending or drawing operation in which the ears of the unit are bent upwardly from the central hub portion, while still hot from the forging operations, into parallelism with each other, and parallel to the axis of the shaft receiving opening already produced in the hub portion of the unit. This brings the two openings in the ears into alignment with each other, and such alignment is on a line intersecting the projected axis of the shaft receiving hole of the hub, and at right-angles to such shaft axis. Thus basically the fundamental requirements of the elemental yoke have been attained.

Starting the above defined steps of the process using a bar of the steel or other selected material, in which the grain extends lengthwise of such bar, a study of the relative effects of the successive operations will show that the grain of the metal in the completed unit must follow the general direction as follows:

The grain in the hub portion will be of general U-shape with the closed lower portion of the U at the lower end of the hub, and with the arms of such U extending thence upwardly to the locations of the ears, curving around into each such ear and terminating at the outer end of each ear. In other words, the grain is at all locations extended in the general direction of the portion of the unit being examined. No cross grain structure is produced, even in the hub portion, notwithstanding that such hub portion was forged laterally from the general length of the bar stock during the first forging operations; or because the hub was thus produced. When the ears are bent into parallelism with the axis of the hub, during the last stated operation, the grain in such ears was by that operation brought into substantial parallelism with such axis. Thus, by the forging operations and the sequence hereinbefore explained, the continuity of grain structure is maintained, and the grain is finally found to be at all points in the direction best suited to receive and withstand the stress to which the unit is subjected during normal operations in service. I have, in FIGURES 1, 2, 13 and 14 shown by stream lines the general direction of the grain structure in the forged unit after forging, but prior to bending the ears into final shape (FIGURES 13 and 14), and the general direction of the grain structure in the unit after bending the ears into the final unit form (FIGURES 1 and 2).

During the bending operation to bring the ears into parallelism with the shaft axis it is evident that the metal at and adjacent to the locations of such bending must be disturbed. Compression forces will be developed at and in the metal at radii shorter than that of the neutral surface of the bending and contrarily, tension forces will be developed at and in the metal at radii greater than that of the neutral surface of such bending. Such tension forces are taken care of during the bending operation by slight stretch of the metal; to take care of the compression effects at the shorter radii locations, and to avoid possibility of producing crimping of the metal, I include the following provisions during the forging operations:

The lower or stationary die (forging) at the least forging stage (the "Finisher" stage), is provided with raised portions which produce in the surface of the unit corresponding recesses, it being remembered that such die surface is engaged by the surface of the unit which will finally be the top surface. These recesses are so located that the metal in the compression area or zone (during the bending operation) may move out into and occupy such portion of these recesses as needed to accommodate the metal disturbances above referred to. The following further statement will emphasize the truth of the foregoing metal movement:

The metal is forged at such temperatures as are found to be good practice and according to the specifications of the metal being used. I have found that steel conventionally known as S.A.E. 1045 Forging steel is desirable; or, alternatively, the conventionally known steel S.A.E. 1146 may be used, or other grades of steel or other metals which are found to be acceptable for the intended operations and products. The following temperatures of the steel at various stages of the process have been found acceptable when using such materials as just above defined; namely; at the "Buster" stage, approximately 2200–2300 degrees F.; at the "Blocker" stage, approximately 2200 degrees F., and approximately the same at the "Finisher" stage; and at the location of the trimmer (which cuts off the scrap and releases the forged units), approximately 2100–2200 degrees F. Finally, at the bending operation, approximately 1500–1600 degrees F. It will be understood that during the forging stages considerable heat is generated by the "working" of the metal, so that there is only slight drop of temperature through such stages and to the location of the trimming operation at which the scrap is cut off. Nevertheless, the temperature at the bending operation is still high enough to enable ready treatment of the unit at such operation, and to permit "flow" of the metal at the locations of the bends, to which reference has already been made.

It is to be understood that statements of specific metal specifications, and temperatures as above given are illustrative only, and that I do not limit myself to such metal specifications, nor to such temperatures, except as I may do so in the claims to follow.

I have herein illustrated and shall describe one convenient set of forging dies, and also other operational units, to enable carrying out the method and process of my invention; but it will be understood that I do not limit myself to such specific units or manufacturing operations, except as I may do so in the claims to follow.

Other objects and uses of the invention will appear from a detailed description of the same, which consists in the features of construction and combinations of parts hereinafter described and claimed.

In the drawings:

FIGURE 6 is a section taken on the lines 6—6 of FIGURES 1, 3 and 5, looking in the directions of the arrows;

Figures 13, 14, 15, 16:
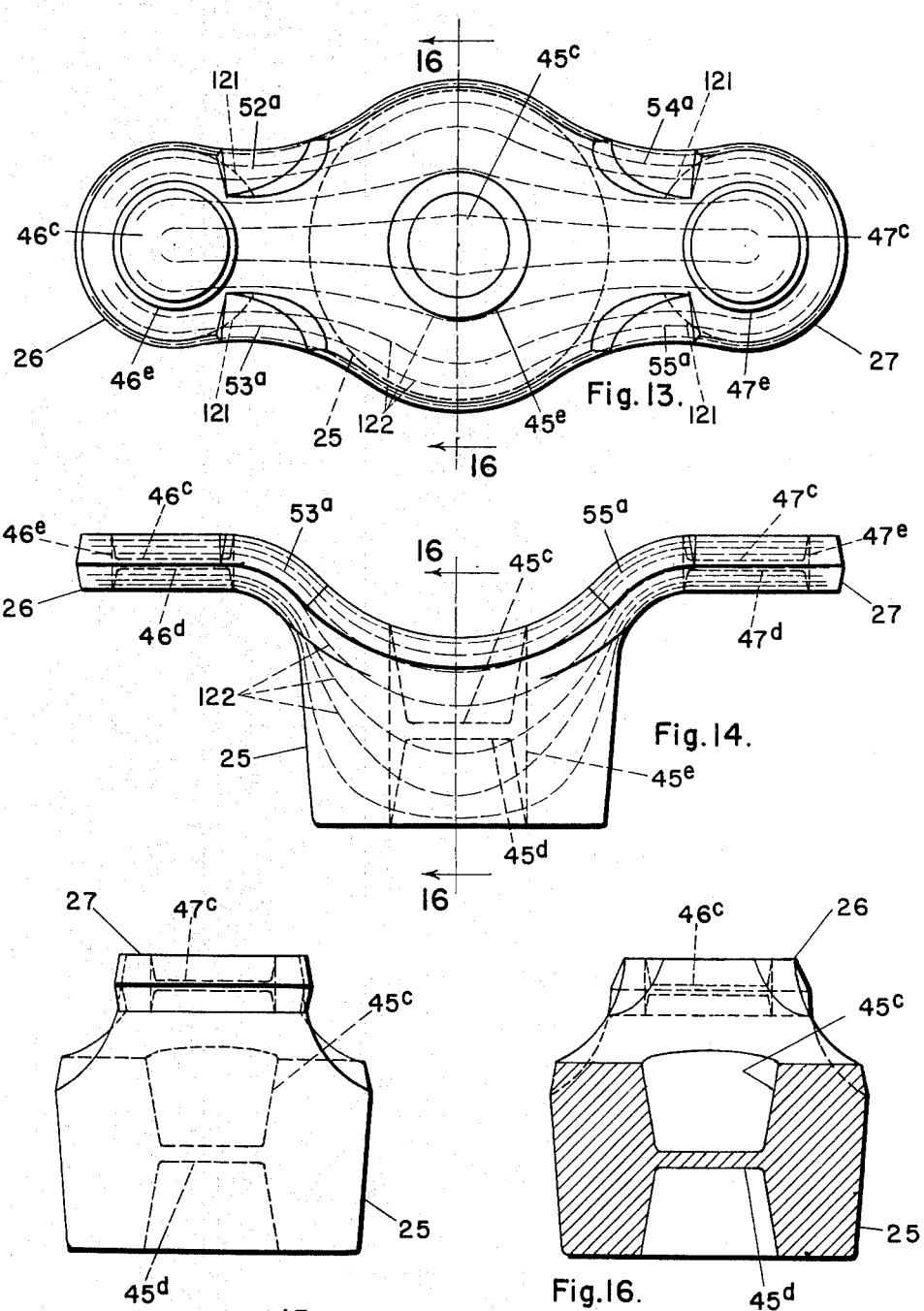

FIGURE 7 shows a side elevation of the forged work body, including two yoke units completed to the point of readiness for the trimming operation to be produced by the die cutting unit shown in FIGURES 10, 11 and 12; and FIGURE 7 may also be considered as a side elevation of the forged work unit as it is delivered from the forging operation produced by the "Finisher" stage of the forging dies, shown in FIGURE 9, such work unit being upside down as delivered from such stage;

FIGURE 8 shows a top plan view corresponding to the showing of FIGURE 7; it being understood that the unit shown in FIGURE 7 is upside-down, and that FIGURE 8 is in fact a bottom view of the double unit shown in FIGURE 7;

FIGURE 9 shows a plan view looking down on the progressive forging die unit, comprising the anvil or stationary die unit; and in this figure the several stages of progress of the forging operation are corerspondingly labelled as "Edger," "Buster," "Blocker," and "Finisher"; it being understood that the hammer die unit includes forging die elements to match the die units shown in FIGURE 9 to produce the opposing surface contours of the forged work element;

FIGURE 10 shows a vertical longitudinal section through a trimmer die unit, upper movable trimming section; and in this figure the several trimming and companion elements of such movable trimming section are shown in their raised or non-trimming position;

FIGURE 11 shows a vertical longitudinal section through the companion lower stationary trimming section of the trimming die unit; and in this view I have shown one of the forged units such as that shown in FIGURES 7 and 8, in place on the lower stationary die unit, preparatory to the trimming operation to be produced by lowering the unit shown in FIGURE 10;

FIGURE 12 shows a vertical cross-section taken on the line 12—12 of FIGURE 11, looking in the direction of the arrows;

FIGURE 13 shows a plan view of one of the trimmed yoke units as it is delivered from the trimmer shown in FIGURES 10, 11 and 12;

FIGURE 14 shows a front edge view corresponding to FIGURE 13;

In FIGURES 13 and 14 I have also shown more or less generally, the direction or trend of the grain of the metal as such grain exists in the forged unit, but prior to bending the ears up into their positions as shown in FIGURES 1 to 6;

FIGURE 15 shows a right-hand elevational view corresponding to FIGURES 13 and 14;

FIGURE 16 shows a vertical cross-section taken on the lines 16—16 of FIGURES 13 and 14, looking in the directions of the arrows;

FIGURE 17 shows a front elevational view of a pressing die unit into which the completely forged and trimmed unit such as shown in FIGURES 13, 14, 15 and 16 is set and operated on for accurately bending the ears up into position parallel to each other and parallel to the axis of the shaft receiving opening of the hub element of the yoke unit, and with the previously pierced openings in the ears, in exact alignment with each other with their axes normal to and intersecting the axis of the hub opening, to complete the forming of such yoke unit (with the exception of any heat treatment and/or normalizing operation which may be desired); and the pressing die unit shown in this figure is constituted to enable delivery of the finally formed yoke units downwardly to a suitable receptacle by a straight-line travel operation;

FIGURE 18 shows a plan view corresponding to FIGURE 17, one of the forged yokes being shown in place both in FIGURES 17 and 18; and in FIGURE 18 I have not shown the interconnection between the presser plunger and the vertically movable slide plate which carries the ear wings (shown in FIGURES 17 and 19), in order to avoid confusion in the showing of other elements of such plan view;

In FIGURES 17 and 18 the presser plunger and the wing carrying ear bending plates are shown in their raised or retracted or initial positions, preparatory to the production of the bending operation;

FIGURE 19 shows a fragmentary cross-section taken on the line 19—19 of FIGURE 18, looking in the direction of the arrows; and FIGURE 20 shows a plan view of one of the wing elements by which the yoke ears are bent into the position of parallelism with the axis of the shaft receiving hole of the yoke hub, while retaining such ear firmly under control during the bending operation.

Referring first to FIGURES 1 to 6, inclusive, I have therein shown in detail a typical universal joint yoke produced according to the operations herein disclosed, and embodying the benefits and advantages incident to the forging operations which are included in such operations. This completed yoke includes the hub portion 25, together with the two ears 26 and 27 which extend upwardly from such hub portion and are parallel to the axis of a shaft received through the shaft opening 28 of the hub portion, and locked to the hub portion in suitable conventional manner. The details of such reception and such locking do not constitute any portion of the present invention; and it will suffice here to state that the direction of the shaft extending through such opening, and the direction of a gimbal axis extending through the two ears must be at right-angles to each other.

A companion yoke unit is connected to the unit shown in FIGURES 1 to 6, and is preferably of identical form and size. A gimbal of conventional form is connected to the ears of the unit shown in FIGURES 1 to 6, and to the ears of such companion yoke unit; and the two sets of ears (of the two yokes) are thus retained at right-angles to each other by pivotal connections to the ears of such sets, the axes of such pivotal connections to the two yokes being at right-angles to each other. Usually the two shafts which are received into the shaft openings (28) of the two yokes are non-aligned with each other; and the function of the universal joint is to transmit driving forces between such two shafts. As is well known, when the two shafts are non-aligned with each other, and in absence of special provision in the gimbal or other torque transmitting element between the two yokes, constant angular speed of drive of one shaft must be accompanied by regularly varying angular speed of the other shaft, such regularly varying angular speed being accompanied by corresponding variations of the transmitted torque. Such variations of angular speed, and corresponding variations of the transmitted torque execute regular cycles of such variations, with two such cycles included in each complete rotation of the two shafts. Only by special provision in the connections between the two yokes may such variations be avoided. One such special provision is afforded by the so-called Bendix-Weiss joint (see McGraw-Hill Encyclopedia of Science and Technology, vol. 14, page 205).

The torque transmitted by or to each yoke must be transmitted by or to the hub of such yoke through the connections of the ears of said yoke to its hub. Accordingly, such varying transmitted forces when they exist, will produce serious vibrational forces at the locations of connection of the ears of each yoke to its hub; and such vibrations, superimposed on the transmitted torques, subject the yoke to rigorous force conditions at the locations of connections of the ears to the yoke hub. Accordingly, special provision to ensure sufficient strength of the locations of such connections should be made in the design or the process used in the production of the yokes to prevent failures at such critical locations; unless such special structural arrangements to produce uniform angular speeds and correspondingly, uniform torques, be included in the design of the universal joint, as suggested above. The inclusion of extra body of the metal at such locations is undesirable, due both to additional weight and cost produced by such extra metal, as well as other design characteristics of the unit, such as need for provision of clearances between the hub and ears of the yoke, and the gimbal by which the two yokes are connected together.

An important feature of the present invention consists in the provision of operational steps during the process of producing the yoke, such that the grain of the metal at the locations of connection between the ears and the hub portion of the yoke, shall be lengthwise or along such connections, thus being continuous through each such connection between the hub and the ear in question. That is, the grain of the metal at and through such connections of the ears to the hub extends lengthwise of each ear from a location well within the body of the hub, to a location well within such ear, so that the forces being transmitted between each ear and the hub are carried by metal of which the grain extends generally lengthwise between the force transmitting elements, as distinguished from a structure in which the metal grain at such location extends across the ear. Thus, a yoke structure embodying this feature of the metal grain structure is one in which the grain at such critical locations is subjected to shear, being thus best able to receive and transmit the produced forces, it being noted that the produced forces are of a twisting nature about an axis lengthwise of the ears.

Figure 2:
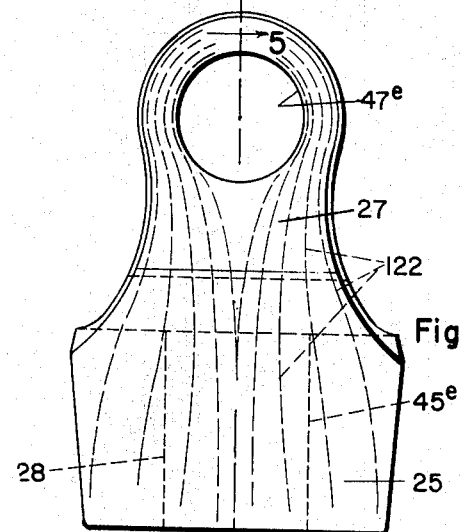
FIGURE 2 is shows a right-hand elevational view corresponding to FIGURE 1; the general direction or trend of the grain of the metal also being shown in this figure.
Figure 1:
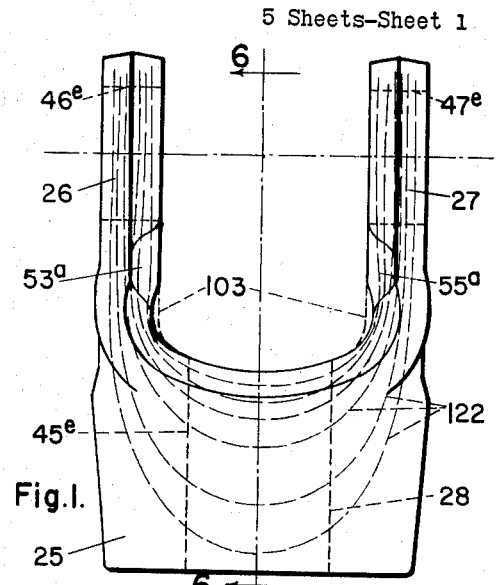
FIGURE 1 shows a front elevation of a completed universal joint yoke produced according to the steps of process or method herein disclosed; and in this figure I have shown, more or less generally, the direction or trend of the grain of the metal produced by the successive steps of the operations.
Figure 4:
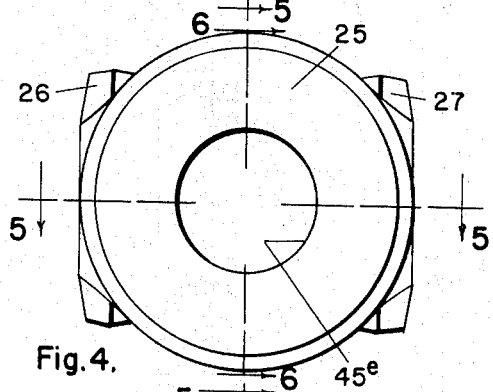
FIGURE 4 shows a bottom view corresponding to FIGURES 1, 2 and 3.
Figure 3:
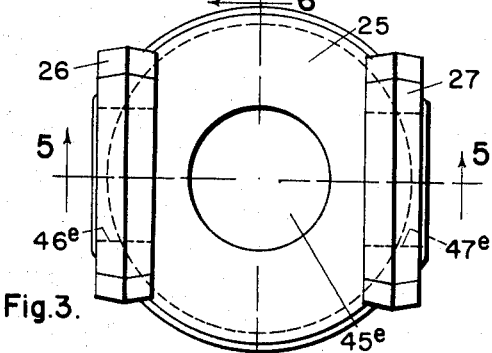
FIGURE 3 shows a top plan view corresponding to FIGURES 1 and 2.
Figure 6:
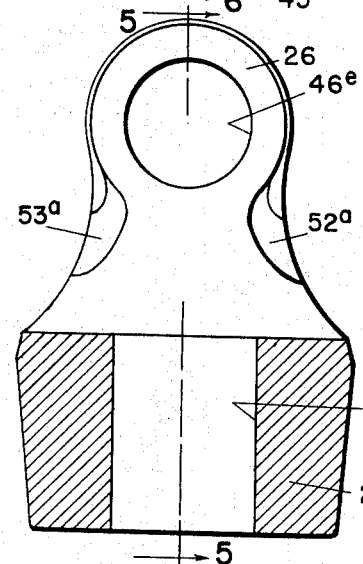
FIGURE 6 shows a vertical section taken at right-angles to the section shown in FIGURE 5.

Examination of FIGURE 1 shows that such lengthwise extending grain structure extends in curved form through the body of the hub between the two ears. Thus such grain structure is substantially continuous through the body of the yoke between the two ears thereof, and through the hub. The manner in which this result is produced will now be disclosed. For this purpose reference is made to FIGURE 9, as follows:

The body of the lower stationary forging die is shown generally by the numeral 29 in FIGURE 9. At one end it is provided with a shallow sink 30, of width (across the die element) sufficient to receive a bar of stock 31, of rod or bar form, and of hot forging temperature (e.g., 2200–2300 degrees F. in the case of carbon steels), and of length sufficient to provide the metal needed for production of two of the yokes (in the embodiment of die shown in FIGURE 9), together with sufficient additional length for convenient manipulation by the forger. Across the central portion of this sink there is provided a ledge 32 against which the central portion of the bar stock will be driven by the hammer die descending from above during its stroke. The near edge portion of such sink is rounded at each of the locations $30^a$ and $30^b$ so that, by provision of a hammer die of proper form, the bar metal at each side of the ledge 32 will be driven against such rounded edge portions, $33^a$ and $33^b$, with corresponding lateral deformation of the bar stock at each such location. Thus, by producing several strokes of the hammer downwardly against the hot bar stock, the latter will be deformed into an enlargement in each of its central portions corresponding to the two portions of the sink. This effect will be enhanced by turning the bar stock back and forth through about ninety degrees between the strokes. In this way two centrally located enlargements of such stock will be forged, one corresponding to each of the sink portions 30$^a$ and 30$^b$.

It is here noted that the forging dies shown in FIGURE 9 are designed for simultaneous production of two of the forged yoke elements; and for convenience of nomenclature I shall refer to the two die sections, and to the two thus produced yoke units, as "a" and "b," respectively. The hammer is correspondingly provided on its under surface, with properly formed companion die elements to match and work with the stationary die elements shown in FIGURE 9.

Having thus initially produced the central bulges or enlargements in the two yoke sections of the bar stock, such stock, still at hot forging temperature, is next shifted to the position of the stationary die elements 34, legended as "Buster" section. These die elements, include the central depressions or sinks 35, the shallow ear sections 36 and 37, and the shallow link section 38 joining the ear sections 37$^a$ and 36$^b$ of the two yoke sections, so that such two yoke sections are retained connected together during the several hot forging operations. Examination of FIGURE 7 shows that the two yoke units there illustrated include the downwardly extending rounded depressions 39$^a$ and 39$^b$, it being understood that in such FIGURE 7 the forged unit is shown upside-down, so that such rounded depressions in reality extend downwardly at the central or hub portions of the yoke units. These depressions are produced by corresponding raised portions of the upper or hammer die, it being understood that such "raised" portions in reality extend downwardly since they are formed on the lower surface of the hammer die.

The lower stationary die includes the upwardly extending studs 40$^a$ and 40$^b$ centrally of the hub sinks 35$^a$ and 35$^b$, and the upper hammer die includes on its lower face correspondingly downwardly extending studs. These upper studs are companion to their lower counterparts; but the lower and upper studs at each of the hub locations are not of enough vertical dimensions to come together when the hammer die is driven down, so that a web of metal remains between the upper and lower depressions produced in the two units by the hot forging operations. Thus, during the forging operations the central opening of the hub of each yoke unit remains closed, at about its mid-elevation.

The lower stationary die includes the upwardly extending studs 41$^a$ and 42$^a$, and 41$^b$ and 42$^b$ centrally of the ear sections 36$^a$ and 37$^a$, and 36$^b$ and 37$^b$, respectively; and the upper hammer die includes on its lower face corresponding downwardly extending studs. These upper studs are companion to their lower counterparts; but the lower and upper studs at each of the ear locations are not enough vertical dimension to come together when the hammer die is driven down, so that a web of metal remains between the upper and lower depressions produced in the ears of the yoke units by the forging operations. Thus, during the forging operations the openings through the ears remain closed, each at about the mid-portion of the ear.

During the delivery of a number of hammer strokes by the dropping of the upper hammer and die onto the hot work body, some excess metal will be forced laterally between the outer perimeters of the upper and lower die elements; and such laterally projected metal will take the form of scrap as the thin flange 43$^c$ shown in FIGURES 7 and 8. However, the upper and/or lower die elements may be provided with stop flanges or the like beyond the perimeter of such scrap, to limit the approach of the die surfaces towards each other during the forging stroke. Thus, the terminal of the down stroke of the upper hammer die may be limited at exactly the proper position to ensure forging the hot work metal to exact thickness dimension.

Having roughed the forging of the twin-yoke body at the location of the "Buster," the work body is removed from the lower stationary die element, by raising it high enough to enable its roughed hub portions to clear the sinks 35$^a$ and 35$^b$ (and to enable the roughed studs depressions 41$^a$ and 42$^a$, and 41$^b$ and 42$^b$, to clear the corresponding die studs), and such roughed forged still hot unit is transferred to the "Blocker" section, being turned over during such transfer. By such overturning of the roughed forged unit it is brought into the position shown in FIGURE 7, with its hubs extending upwardly instead of downwardly as before. The lower stationary die element at the "Blocker" position is provided with a central upwardly extending rounded surface across the central portion of each yoke unit, corresponding to the depressed rounded portion 39$^a$ or 39$^b$ of FIGURE 7, so that with the still hot rough yoke forging set into place at such "Blocker" position, such depressions 39$^a$ and 39$^b$ will set over and accommodate the such upwardly extending rounded portions of the lower stationary die. However, such lower stationary die element is provided with a depressed floor 43, of size and contour and surface configuration to receive the lower surface of the turned-over yoke units. The perimeter of such depressed floor is shown by the line 44. There extend up from such floor the studs 45, corresponding to the hub depressions from the top surfaces of the yoke units (being the top surface when such yoke units are right-side up); and such lower stationary die element is also provided with the studs 46$^a$ and 47$^a$, and 46$^b$ and 47$^b$, corresponding to the ear depressions from the top surfaces of such ears. Also the perimeter of such depression to the floor of the stationary element is preferably bevelled to facilitate removal of the yoke after producing the hot forging strokes at the "Blocker" position.

The upper hammer die is provided on its lower die face with configurations companion to such upper face and elements of the lower stationary die. Thus, the upper hammer die at the "Blocker" position includes a properly shaped and dimensioned recess to receive and work on the upstanding rounded portion of each of the yoke elements, and to receive and work on the upstanding hub portion of each such yoke unit; and is also provided with downwardly extending studs companion to the studs 45$^a$ and 45$^b$ of the hub portions of the yoke units, and companion to the studs 46$^a$ and 47$^a$, and 46$^b$ and 47$^b$, for the ears of the yoke units; and such lower face of the upper hammer die is also provided with a depression corresponding to each of the depressions 43$^a$ and 43$^b$, such hammer die depression being also provided with a bevelled perimeter corresponding to the bevelled perimeter of the depression of the lower stationary die. Both of the dies at such "Blocker" position are also provided with companion depressed portions extending between the die elements corresponding to the ears 37$^a$ and 36$^b$, to receive and accommodate the lug joining the two yokes together.

Several strokes of the hammer die with the still hot yoke units at the "Blocker" position will serve to improve the accuracy of the forged units and prepare them for the final or finishing hot forging operation. This operation is performed at the "Finisher" location, conveniently located centrally of the dies and between the "Buster" and "Blocker" positions. Accordingly, such "Finishing" position is advantageously located to ensure most accurate registry of the hammer and stationary dies at the instants of stroke. The lower stationary die and the upper hammer die at this "Finisher" location are similar to the dies at the "Blocker" position, but examination of such "Finisher" position will reveal the inclusion of raised lugs 48ᵃ, 49ᵃ, 50ᵃ and 51ᵃ at positions close to and at the sides of the positions of juncture of the ear forming elements of the dies, for the left-hand yoke unit, and corresponding raised lugs 48ᵇ, 49ᵇ, 50ᵇ and 51ᵇ at positions close to and at the sides of the positions of juncture of the ear forming elements of the dies, for the right-hand yoke unit. These raised lugs produce corresponding recesses in the yoke units, as shown at 52ᵃ, 53ᵃ, 54ᵃ and 55ᵃ in FIGURE 11. These recesses will be discussed hereinafter.

It has been mentioned that the temperature at the commencement of the foregoing forging stages may be by way of example only, approximately 2200–2300 degrees F. At the trimming stage, next to be described, the temperature may be, also by way of example only, approximately 2100–2200 degrees F. Accordingly during the several successive forging stages, ending at the "Finisher" stage, there has been little drop in the temperature of the work body. Losses of heat due to radiation, convection (to the die elements) and otherwise, have been substantially compensated for by the heat developed during the "working" of the metal, and the forging impacts, during the forging stages.

Next, the following examination of the changes in form of the work body during the forging operations, as such changes affect the general direction of the grain of the metal, is pertinent. This is true since it has already been stated that one object of the invention relates to the production of units in which the direction of the grain is well adapted to production of maximum strength of the unit to resist stresses developed during the normal use of the unit. The following exploration is in order:

Comparison of the form of the bar stock used at the beginning of the operations, and the grain lines of such stock, with the side elevation of the completely hot forged (but as yet unfinished unit), shown in FIGURES 7 and 14, reveals that, due to formation of the hub portions by a lateral displacement of metal from the original straight line form of the bar stack, results in bending the "stream lines" 122 of the grain from their original straight line form, into a broad U-shape, with the successive stream lines reaching deeper and deeper into the body of the hub portion; but the continuity of such stream lines from one ear, through the hub portion, and outwardly to and through the other ear to its extremity, has not been disturbed. Thus, with the so-far described steps of process, the grain of the metal has retained its general condition of extending lengthwise through the work body, from the tip of one ear, through the hub portion, and to the tip of the other ear. No sharp bends have been encountered by such stream lines at the locations of junction of the ears with the hub portion; and at the locations of such junctions, the sharpness of curvature of such stream lines is a minimum, with consequent minimum effect on the strength of the metal body at such junction points. These relations will be seen, particularly from examination of FIGURE 14, wherein it is seen that many of the stream lines pass almost directly across the hub portion between the two ears.

Examination of FIGURE 13 also shows that the presence of the shaft receiving opening through the central portion of the hub merely serves to cause the stream lines to swing laterally to the sides of such opening, on broad curves, but without any discontinuity of the stream lines during such progress between the two ears.

The relation of the stream line forms to the final form of the complete unit will be further discussed hereinafter. The effect of forging the deep recesses in the top and bottom portions of the hub will also be explained more fully hereinafter.

The forged double unit thus far described is next die cut to release both of the units from the surrounding scrap metal, preparatory to subjecting such so-released units to a forming operation by which the ears are turned into positions parallel to each other, and parallel to the axis of the shaft receiving opening in the hub. The die cutting operation also includes the piercing of the hub opening of each unit, and the piercing of the openings through both ears of each such yoke unit. By producing such piercing operations through all of the openings at one and the same operation there is assurance that all such openings of each yoke will be properly and exactly related to each other, so that the next forming operation (to bend the ears of each yoke unit into such parallelism with each other and with the hub opening) will bring the ear openings into exact alignment with each other, and symmetrically located at the sides of the projection of the shaft axis through the yoke unit. Reference is made to FIGURES 10, 11 and 12, which show a convenient form of such die cutting and piercing tool, as follows:

The lower stationary, female die unit 56 is conveniently set into a base element 57, which may thus receive different female elements formed to handle different sizes and designs of work body to be acted upon. Such female die unit includes the two positions at "A" and "B" which support the two forged and still connected together yoke units shown at 58 and 59, the connecting strap 60 still connecting such two units together. The upper surface of such female die unit is properly formed and contoured to receive and provide even support for each of the yoke units, and is also properly formed to permit the cutting elements of the male die unit to produce their functions. Accordingly, such female die unit includes the two recesses 61 and 62 to receive and support the hub portions of the yoke units; and also includes the horizontal ear supporting surfaces (unnumbered) as that the ear piercing operations will be accurately executed. Such female die unit also includes the two drop-out vertical passages 63 and 64 beneath the central portions of the hub receiving recesses 61 and 62. Such female die also includes the four drop-out vertical passages 65 and 66 beneath the ears of the yoke unit "A," and 67 and 68 beneath the ears of the yoke unit "B." Such female die also includes a drop-out vertical passage 69 beneath the location of the connecting strap 60. The supporting surfaces of the female die for the two yoke supporting positions "A" and "B" are provided with cutting edges 70 and 71, respectively, formed with perimetral contours exactly corresponding to the intended cut-out forms of the two yoke units released from the work body. It is unnecessary to show in detail the contours of such cutting edges, since they conform to the outer perimeters of the two yoke units, one of which is shown in FIGURE 13.

The upper die unit, shown in FIGURE 10, numbered 72, is shown as supported from the vertically movable press-head 73, which may be of conventional form. Such upper, male die unit includes the die member or block 73 which is rigidly connected to the press-head by means not shown. Such connection conveniently includes the flange portion 74 seated into a recess in the lower face of the press-head up to the shoulder 75 which thus fixes the projection of the element 73 below the press-head. The block 76 is clamped between such flange portion 74 and the floor of the recess in the press-head. Such block receives the piercing pins or studs 77 and 78, corresponding to the openings to be pierced through the hubs of the two yoke units; and also receives the piercing pins or studs 79 and 80, and 81 and 82, corresponding to the openings to be pierced through the two ears of the yoke unit "A," and through the two ears of the yoke "B," respectively. It is noted that, for the above purposes the pins 77 and 78 are longer than the pins 79, 80, 81 and 82, due to the fact that the hub portions of the yoke units are lower down than the ears of such yoke units.

Examination of FIGURES 10 and 11, and 13, shows that during the piercing of the holes for both the hubs and the ears a slight amount of metal is removed or trimmed through each such hole, since the forging operations have produced the depressions into the hubs and into the ears, with tapered faces, whereas the pierced and finished openings are perfectly cylindrical and smooth, and of slightly larger diameters than the forged depressions. Such relationships between the forged depressions, and the pierced openings are shown by comparison of FIGURES 1 through 6, with FIGURES 13, 14, 15 and 16.

Conveniently, such pins or studs 77 to 82, inclusive, are retained securely to the block 76 by providing them with upper end flanges 83 received into enlarged upper ends of the holes through the block 76, the parts being so proportioned that when the element 72 is brought to its shoulder 75 against the under face of the element 73, such block, with the pins 77 to 82, is securely locked in place to the press-head.

The trimming operations on the forged double yoke work body are performed by the trimming edges 84 of the element 73, which edges conform accurately to the desired trimmed perimeters of the two yoke units to be released from the scrap. It is noted that such element 73 includes a central portion 73$^a$ which extends across the element 73 in position to complete the perimeters of the two yoke units, and also thereby releases the strap element 60 by which such two yoke units had been connected together. Such so-released strap element then falls into the drop-out vertical passage 69.

In order to hold the work body securely in place on the surface of the lower female die unit during such operations of the upper die elements, there is provided the block 85 carried by the upper die unit 73, but vertically slidable therein. The lower surfaces of this block 85 are curved and otherwise formed to conform accurately to the upper surfaces of the yoke units in place on the female die unit; and the perimeters of such block unit 85 (shown as divided into the sections 85$^a$ and 85$^b$, corresponding to the two yoke units) conform nicely with the trimming edges 84 so as to afford good support of the work body against the surface of the female lower stationary die unit, during the cutting operations.

Such body 85 has its two sections 85$^a$ and 85$^b$ connected together by the top flange-like portion 86, so that both such portions 85$^a$ and 85$^b$ may slide within the element 73 as a unit. The end portions of such portion 86 extend laterally far enough to come to rest against the upwardly facing shoulders 87 and 88 of the element 73. Thus, during raising of the press-head such sections 85$^a$ and 85$^b$ are raised after the unit 73 has been raised far enough to bring such shoulders against the projecting end portions of the flange-like element 86; but during such raising of the sections 85$^a$ and 85$^b$ they project below the cutting edges 84. The weight of such unit 85 (including its sections 85$^a$ and 85$^b$) is sufficient to strip the die cut yoke units from the cutting edges 84 of the unit 75, during the first portion of the rise of such unit 73, so that the two cut-out yoke units are left resting on the upper face of the female die unit. The clearance above the flange-like portion 86 is also sufficient to allow for needed downward movement of the press-head and the piercing pins or studs, after the elements or sections 85$^a$ and 85$^b$ have come to rest against the top surfaces of the yoke units, to allow for the proper trimming operations to be performed by the cutting edges 84. Thus, upon raising retreat of the press-head the cut-out yoke units and the severed scrap, are left standing on the top portion of the lower stationary female die unit. In FIGURE 8 such scrap material is shown at 43, encircling the two yoke units. However, such scrap material will generally have a ragged outer perimeter instead of a regular perimeter as there shown.

These trimming and piercing operations are performed directly after the forging operations previously described have been completed and while the forged units are still hot, close to the forging temperature already stated.

The trimmed units thus delivered by the trimming operation of the die press shown in FIGURES 10, 11, and 12, are shown in FIGURES 13, 14, 15 and 16 in which figures I have shown the recesses produced in the unit by the forging operations, and prior to the piercing operations produced by the die press unit, all such depressions corresponding to the holes to be produced through the hub and the ear elements; and in such FIGURES 13 to 16, inclusive I have also shown the pierced openings through such hub and ear elements. Such pierced openings are also shown in FIGURES 1 to 6, inclusive, which illustrate the completed yoke unit, including the pierced holes, but after the bending of the ears into parallelism with the hub, already referred to. For convenience in nomenclature, the depressions produced in the ears during the forging operations are numbered as 46$^c$ and 46$^d$, and 47$^c$ and 47$^d$, in FIGURES 13 and 14; and the depressions produced in the hub portion of each unit, during the forging operations are numbered 45$^c$ and 45$^d$, in such figures. Then, to avoid confusion I have numbered the pierced holes in the ears as 46$^e$ and 47$^e$, in said FIGURES 13 and 14; and have numbered the pierced hole in the hub of the unit, as 45$^e$, in said figures. Examination of such figures, as well as others, will show the small amount of metal removed during the piercing operation, from each hole location.

After producing the trimming operations as explained in connection with the description of FIGURES 10, 11 and 12, the still hot units are subjected to a die pressing operation to bend the ears into the desired parallelism with the axis of the hub opening, as already explained. Reference is therefore made to FIGURES 17, 18, 19 and 20 which show a convenient embodiment of the bending machine which will produce such ear bending operations, as follows:

This ear bending machine includes a vertically slidable plate 86 located at the back of the machine, and guided in its vertical movements by the side guide bars 87 and 88 secured to a suitable stationary frame or supporting element, not shown. Such slide plate has pivotally connected to it the two wing elements 89 and 90 at the left-hand and the right-hand sides of the vertical medial line of such slide plate. Such pivotal connections are shown as comprising the stiff studs 91 and 92 carried by the slide plate, and on which the wing elements are respectively pivoted to permit rock of such wing elements through substantially ninety degrees of rock from the full line positions of such wings, shown in FIGURE 17, to the dotted line positions also shown in such figure, such dotted line positions being numbered with the suffixes "a." Conveniently, such wings are provided with the rearwardly extending portions at their pivoted sections which are proximate to each other, so that the ear supporting portions of such wings are convenient of access for insertion of the forged straight wing units into working position, preparatory to the actual bending operation to be performed. Such wings are provided in their forward portions with the recesses 93 and 94 into which the ears of the forged unit are inserted and are retained during the bending operation. Such wings are shown in FIGURE 18 in their horizontal positions, and one of the forged units is shown in place with its ears inserted into such recesses, and FIGURE 17 also shows such condition of the parts, by the full lines.

Beneath each of the wings there is provided and supported by suitable means, a cam shaped block on and against which such wing rests and is guided during the bending operation. These are the blocks 95 and 96. Each includes the inner end portion having a top surface of generally circular form, 95$^a$ and 96$^a$, respectively, and also includes an outwardly extending supporting portion, 95$^b$ and 96$^b$, which is laterally adjustable with respect to a stationary supporting bar 97 or 98, to which such portion 95ᵇ or 96ᵇ is connected by the screws 99 and 100, extended through the slots 101 and 102 formed in such extension portions. By this arrangement such cam blocks may be laterally adjusted to calibrated positions with respect to each other, and with respect to the wings which they support, to produce the intended operations, presently to be explained.

It is here noted that with the slide plate 86 in its raised position, with the wings correspondingly raised to their highest position (shown in FIGURES 17 and 18), such wings extend outwardly into horizontal positions, aligned with each other, and in position to receive the ears of the forged unit, as best shown in FIGURE 17. During the downward movement of the plate 86 such wings ride over the curved cam surfaces toward each other and into vertical alignment, and into parallelism with each other, as shown at 89ᵃ and 90ᵃ in dotted lines in FIGURE 17. Such downward and rocking movement of the wings serves to bend the two ears upwardly and towards each other into the desired parallelism of such wings as shown by the dotted lines 26ᵃ and 27ᵃ in FIGURE 17. This operation also occurs while the forged units are still hot.

The downward movements of the plate 86, the wing elements 89 and 90, and the supported yoke unit, are produced by downward pressure exerted against the top surface of the hub portion of the yoke unit, conveniently by the vertically movable presser bar 103 whose upper end 104 is conveniently connected to a suitable vertically reciprocable, power driven unit, such as a hydraulic cylinder, with provision for raising and lowering such cylinder's piston or plunger by hydraulic means, and under suitable valve controls. Such specific vertical drive means for the plunger element 103 is not shown in the drawings, since such reciprocating means are well known in the arts, and I do not intend to limit myself to any specific means of drive of such plunger 103.

Such plunger 103 should have its lower end of contour to engage the top surface of the hub portion of the yoke unit around the pierced shaft opening, previously formed in such hub portion, and without damage to the hub portion due to the pressure exerted by downward depression of such plunger, it being again noted that the forged unit is still hot during this bending operation so that the metal is still comparatively soft. This temperature condition is also referred to hereinafter. In this connection it is noted that during the bending of the ears towards each other their top surfaces become proximate to each other, approaching each other until completion of the bending into the vertical ear positions. At such time the proximate surfaces of the ears have approached to each other into the position shown in FIGURES 1, 3 and 5. Accordingly, the lateral dimension of the plunger element 103, being the diameter of such plunger element when it is circular as shown, must not be greater than the final distance between the proximate faces of the two ears. In FIGURE 17, wherein the bent form of the yoke unit, and the final positions of the ears, are all shown by the dotted lines, it is seen that such ears have come just into engagement with the opposite sides of the plunger, being the terminal position of the bending operation.

It is also seen, from examination of FIGURE 17, that at the time the ears have completed their bending and come into engagement with the opposite surfaces of the plunger 103, the wings have completed their ride down over the cam surfaces, and have come into a vertical position. Accordingly, when this condition of the parts has been attained, the formed and still hot yoke unit may drop straight down from the wings, for delivery to a convenient receptacle, since the wing recesses have now come into position with their notches 93 and 94 open at their lower ends, and thus the ears are enabled to slip down from further engagement with such recesses. All such disengagements may occur unless restrained by frictional or other engagements of the parts. In actuality, the frictional engagement of the ears with the plunger will usually prevent free descent of the completely bent yoke unit, so that disengagement of the plunger from the ears must be provided for. For this purpose I have provided the two dogs 105 and 106, pivoted to brackets 107 and 108 extending down from the cam units, the pivotal axes being shown at 109 and 110, respectively. The inner proximate ends of these dogs are serrated in cam fashion to engage the opposite sides of the hub 28ᵃ of the yoke unit during the last portion of the descent of such yoke unit under drive of the plunger. Springs 111 and 112 serve to urge such dogs into good engagement with the hub portion, and the dogs will thus hold the completed yoke unit against rise with the plunger when such plunger is raised by the stated power mechanism. Thus, as such plunger rise progresses and the frictional engagement between the plunger and the ears is broken, the yoke unit will be released from further restraint and will drop down away from the bending machine.

Further exploration of the foregoing operations and relationships will reveal the following:

With the vertically movable plate 86 in its raised position, shown in FIGURE 17, downward movement of such plate must be accompanied by rock of both of the wings, the wing 89 rocking clockwise about its stud 91, due to engagement of the under face of such wing with the cam element 95ᵃ, and the wing 90 rocking counterclockwise about its stud 92, due to engagement of the under face of such wing with the cam element 96ᵃ. But, with the forged yoke unit set into place with its ears in the recesses 93 and 94 of the two wings, any downward movement of the plate 86 (and the studs 91 and 92) can only occur by production of such wing rocking movements, during which the outer ends of the recesses 93 and 94 must approach each other; and since the outer end portions of the ears should and normally do nicely engage such outer recess end portions, it is evident that downward movement of the plate 86 and the studs, is prevented, unless bending of the ears immediately commences, to enable approach of the ear ends (and the outer end portions of the recesses) towards each other. However, the mere weight of the plate 86 and connected parts is not sufficient to produce such action; but more importantly, such bending cannot occur without simultaneous descent of the hub portion of the yoke unit, since the outer end portions of the wings are being sustained by the stationary cam elements 95ᵃ and 96ᵃ, about which outer wing ends pivoting of the wings must occur during descent of the parts, in the initial stages of such descent. It is thus necessary to apply a downward driving force against the central or hub portion of the hub unit, to bring about the desired deformations of the ear connections to the hub, under the restraining forces developed by the retaining of the ears within the recesses. The plunger 103 provides such downward drive.

Having provided means to produce downward drive of the hub portion of the yoke unit, it also becomes necessary to ensure a coordinated downward movement of the plate 86. In the early stages of the downward movement of the hub portion a downward drive will be exerted against the portions of the wings 89 and 90 which lie beneath the shoulder connections of the ears with the hub portion of the yoke unit, since any bending of the ears in the early stages of the downward movement will produce only slight changes of the vertical positions of the undersurfaces of the ears close to the connections of such ears with the hub portion. Accordingly, during such early stages of the descent the plate 86 will be driven (through the studs 91 and 92) down in substantial harmony with the downward drive of the hub portion by such plunger 103. As such downward movement continues, however, with the wings and ears rocked more and more away from their original positions, and more and more towards each other, it will be seen that the downward movement of the plunger and the hub will exceed that of the studs and the plate 86, since the distance between the locations 113 and 114 of the wings remains greater than the lateral distance between the studs, and the wings are pivoting about changing locations on the cams 95ª and 96ª. Accordingly, there will commence and continue a tendency for the wings and the ears to descend slower than the hub itself.

Examination of FIGURE 17 will show that when the downward movement of the parts has been completed, to bring the ears into their finally desired conditions (above the dotted lines 26ª and 27ª in FIGURE 17), the actual descent of the upper face of the hub (and of the plunger) is the same as the actual descent of the studs. To ensure that such final condition shall be produced I have provided a connection between the plunger and the plate 86 such that both these elements shall move down together. For this purpose I have provided the rearwardly extending lug 115 on the plunger which etxends over the upper edge of the plate 86 (see FIG. 19), and an adjustable stop screw 116 is threaded through such lug into position to engage the upper edge of the plate 86 and thus produce down drive of the plate harmoniously with the downward movement of the plunger.

Conversely, when upward movement of the plunger commences it is desirable to allow the plate 86 and studs 91 and 92 to lag behind the rise of the plunger for a small distance, to ensure that the plunger shall break its frictional engagement with the proximate faces of the ears, it being noted that the rise of the formed yoke unit is now prevented by engagement of the dogs 105 and 106 with the hub of the yoke unit. To effect this result I have made the following provisions:

The arms 117 and 118 extend laterally from the lug 115 to positions over the plate 86 far enough separated from each other to ensure against rock of such plate about an axis extending through the plate, as such rock would produce a serious binding of the plate in its guide bars 87 and 88. I then provide the studs 119 and 120 extending up from the plate and through openings of the arms to positions above the arms, with heads on such studs to be engaged by the arms during the rising movement of the plunger, with corresponding rise of the plate 86. But such heads are so positioned as to provide for a desired amount of lost-motion prior to engagement of the arms with the heads, and thus to ensure for breakage of the frictional engagement between the proximate faces of the ears and the sides of the plunger.

I have previously mentioned that the temperature of the yoke unit delivered from the forging operations and trimmer may be of the order of 1500–1600 degrees F. At this temperature the yoke units are readily deformable by the unit shown in FIGURES 17–20 and are readily bent into the desired ear positions without exertion of seriously large forces during such bending operation, and without development of serious internal stresses in the yokes, especially at the locations of such bends, where torque and other driving forces produced during the expected use of the units will be a maximum.

Figure 5:
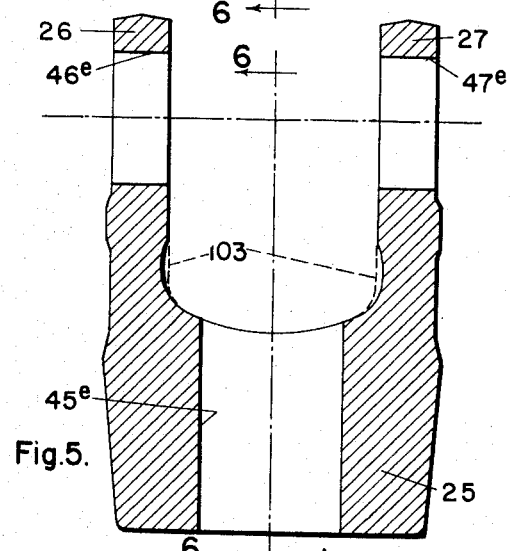
FIGURE 5 shows a vertical section taken on the lines 5—5 of FIGURES 3 and 4, looking in the directions of the arrows.

I have also referred to the production of the recesses 52ª, 53ª, 54ª, and 55ª (see FIGURE 13), at the locations of junction of the ears with the hub portion of the yoke unit. It is evident that, during the ear bending operations, the metal at the inner surfaces of the bends must be crowded laterally outwardly into such recesses, to avoid crimping the metal at such locations. The presence of the plunger 103 having its lower end properly curved to accommodate the form of the surface which will be produced by such bending, serves to prevent such crimping, and the recesses provide the spaces into which the laterally moved metal may shift. In connection with the foregoing it is also noted that the form of the lower end portion of the plunger conforms to the curvature which may be expected to be produced at the location of the inner faces of the junctions of the ears with the hub portion. In FIGURES 1 and 5 the form of the lower end of the plunger is shown by the dashed lines carrying the numeral 103.

Examination of FIGURES 1, 3, 4 and 5 shows that the outer faces of the ears are in substantial alignment with the outer faces of the hub at the locations of the junctions of the ears with the hub. This condition is secured by forming the hub of a diameter substantially as great as the distance between the outer faces of the ears. Under this condition the grain lines 122 (see FIGURE 1) pass directly between the hub and the ears without reversal of curvature. This condition is most favorable for the transmission of the large forces when the yokes are of large size and are used for transmission of large torques.

It is now noted that I have herein disclosed a continuous operation for the production of the yoke units from step to step, including several stages of hot forging operations, and subsequent trimming and bending operations, all of which steps are produced at raised temperatures corresponding to the requirements of such steps, and without need of re-heating or otherwise temperature controlling between the successive steps. The temperature of the units during the several forging steps is maintained by heat produced by the "working" of the metal in such steps, so that the units are delivered to the trimming die press at temperature desirable for production of the trimming operation. The bending operation may be conducted at lower temperature such as 1500–1600 degrees F., since the metal is still hot enough to enable production of the bending operation without production of serious strains internally, and it is also noted that at this stage each of the two units previously produced simultaneously must be individually acted on in the bending stage.

Although I have herein stated certain specific metals such as steels which may be used in the foregoing operations, and for production of the products herein described, and have also stated certain temperatures at various stages of the sequence of operations, it will be understood that I do not intend to limit myself thereto, except as I may do so in the claims to follow. It is also evident that the foregoing disclosed operations may also be used for production of various units other than yokes for use in universal joints, and the like. Thus I do not intend to limit myself to production of such specific category of units, except as I may do so in the claims to follow.

Examination of FIGURE 13 shows the dotted curves 121 adjacent to each of the sides of the ears 26 and 27. These indicate outer faces of the recesses 52ª, 53ª, 54ª and 55ª, but of smaller size than indicated by the full line showings at the outer end faces of such recesses. The sizes and contours of the recesses may be made to conform to the requirements of the unit.

It has been stated in the early portion of this application that the universal joint yokes produced by the herein described method or process are primarily intended for use or incorporation in yokes of universal joints transmitting considerable or large torques between the driving and driven shafts. Every operation hereinbefore defined has been incorporated with the purpose and prime object to produce yokes of great strength (comparable to their sizes), and to this end, to devise the steps of process in manner to ensure the highest attainment of this objective consistent with the basic metal used, generally carbon steel. Also, since these yokes are primarily intended for power and like transmissions, it is of the highest importance that the openings which are to receive the driving (or driven) shaft, and the openings which are to receive the gimbal shaft bearings, shall be very accurately located, and that the two bearings of the ears of each yoke shall be aligned to bring the axis through such bearings to a condition of normalcy with respect to the axis through the hub opening, in order to avoid binding and other seriously objectionable imperfections in the yoke's final form.

Additionally, as hereinbefore pointed out, it is highly important to reduce the costs of production for reasons of the highest economic nature. The present process and method, by which not only the openings through the ears, but also the opening through the hub, are all simultaneously produced by the die piercing operations while the ears are still in their straight-line forged positions, ensures a high degree of accuracy, not only as to alignment of the ear openings with each other, but also ensures exact spacing of the opening through each ear, from the hub opening. This is true since all such openings are produced simultaneously by a single press-head carrying all of the male piercing dies needed to produce all three of the openings. This condition is also related to the provision of the recesses in both of the ears, as well as at the top and bottom ends of the hub. It would be physically impossible, in the case of a power transmitting universal joint, to die punch the hub opening to any required degree of accuracy of placement and direction of pierce, if the great thickness of the hub required such piercing operation to be performed through such thickness, even while the unit was hot. The recesses forged in the hub (as well as those forged in the two ears), come close together, leaving only a rather thin web or partition to be pierced out. But examination of various of the figures, notably FIGURES 7, 11, 14 and 16 shows that each recess is defined by a tapered wall, thus providing the desired drag to enable proper forging to be produced. And FIGURES 1, 2, 5, 6 and 14 show, by such dashed lines as 45e that the final piercing operation need remove only a trimming amount of the metal (other than the partition) during the piercing operation. Thus, tendency for the male piercing die to deflect during the piercing operation, is reduced to a minimum.

All of the foregoing benefits presented by the present process or method, are highly beneficial as compared with previously practised operations entailed in the production of power transmitting universal joint yokes; which previous operations have included the need of drilling or boring the hub openings. Such operations, conventionally practised, entail accurate setting up of each yoke into the lathe or drill, as well as the large time required per yoke, to produce such drilling operations.

Examination of FIGURE 13 in particular, will show that the grain stream lines passing through the hub, between the two ears, are deflected laterally as they enter such hub portion from one ear, to a maximum deflection at the mid-point of the hub, and then return towards the center line (as drawn between the two ears) on return curves. The two schematically shown stream lines close to the aforesaid center line of the unit only execute slight lateral deformations, and will be considered later. It is also noted that all but a few of the stream lines pass the hub recess 45e, being deflected laterally far enough to avoid such recess, and when such recess has been passed, such stream lines return to alignment with their locations as shown at the original side of the recess. The two stream lines shown as crossing the recess are those which are located at elevations in the hub, such that said stream lines may pass through the thin web which was left between the top and bottom recesses forged into the hub. These comprise such a small portion of the total of the stream lines that they may be disregarded in the present discussion. Actually, the stream lines which are deflected laterally to locations at the sides of the forged recesses, will comprise many thousands; but the schematic showing of FIGURE 13 will serve to illustrate the important fact that the great body of grain stream lines which extend between the two ears when such recesses are forged, avoid such hub recesses and are continuous and curvilinear from ear to ear. This continuity is due to the forging of the recesses, as follows:

Prior to the forging of the recesses in the top and bottom portions of the hub, the locations of such recesses were occupied by metal comprising a portion of the original billet. Thus, until the recesses were forge formed all of the stream lines passed more or less directly from one ear, through the body of the as yet incompletely forged hub (and recesses) to the opposite ear. Then, as further forging proceeded, to form the hub recesses by such forging, the metal originally occupying the recesses was displaced laterally, carrying the stream lines to their new and deflected paths. The "lateral" displacement across the unit (on the section line 16—16 of FIG. 13) is limited by the walls of the forging dies (see FIG. 9), but since said walls continue lengthwise of the ears, the "lateral" displacement of the metal from the top recess extends into the portion of the forging which will constitute the roots of the ears, thus carrying the grain flow lengthwise through said roots and lengthwise into the ears; with substantial increase in the strength of the roots of the ears, to resist torque forces transmitted between the hub and the ears. As stated above, the few lines within the remaining thin web were not thus displaced laterally. Actually, when using forging dies of the general form and contour shown in FIGURE 9, the formation of the hub recesses would proceed more or less continuously (as the forging blows were produced), but the above statement respecting the "lateral" displacement of the metal originally occupying the recess locations, is correct.

Such lateral displacement of the hub metal also ensures good forging of the body of the hub against the deep side walls of the dies.

Study of FIGURE 13 also shows that the cross-section of the completed yoke metal at the position of the hub axis is substantially the same as the cross-section of the root of each ear. Thus the cross-section between each ear and the junction thereof with the hub is substantially the full value, the same as the cross-section of the metal remaining at the sides of the hub after the forging of the upper and lower recesses. Per contra, the following distinctions of such structure as compared with a structure in which the central hub axial passage is drilled or bored vertically through such hub, are pertinent;

In such bored or drilled type of yoke all of the metal thus bored or drilled is permanently removed from the hub. Thus all of the stream lines originally passing through the space drilled out are removed, they are discontinuous from one side of the opening to the other side. The metal originally occupying the drilled opening is removed from the hub, it is not displaced laterally, and the grain flow lines so removed are destroyed, not shifted laterally without destruction of discontinuities; they cannot be validly compared to the continuous curvilinear lines shown at the sides of the recess 45e of FIGURE 13. Also such drilling cannot possibly produce any "lateral displacement" of the metal thus drilled from the hub to provide the shaft receiving opening. Thus the hot forging of the hub recesses not only makes it possible to pierce the shaft receiving opening through the hub at such recesses, but such forging of the recesses produces a yoke structure in which the grain flow is entirely different from that produced and remaining in a yoke which is not forged to produce the hub recesses; but wherein the shaft receiving opening is drilled the full vertical dimension of the hub. Thus, too, the forging of the recesses makes it possible to produce a completed yoke having a maximum strength at the roots of the ears where such strength is most needed to resist the stresses of torque.

I claim:

1. As a new article of manufacture, a forged steel yoke, including a body hub having a shaft receiving opening extending axially of such hub, and having oppositely disposed ears connected to one end of the body hub at opposite sides of the axis of such shaft receiving opening by curvilinear roots, said ears including substantially flat portions lying in parallel planes parallel to and located at opposite sides of the axis of the shaft receiving hub opening, said yoke comprising an integral body of steel wherein the grain of the ears extends lengthwise of such ears, and wherein such grain of the ears includes lines extending through the hub in continuous curves concave upwardly through the hub at both sides of the shaft receiving opening between the ears and through the roots of the ears.

2. A torque transmitting universal joint yoke, comprising a unitary metallic body including a hub element constituted for attachment to a shaft element, and also including a pair of ears with curvilinear roots of said ears integral with the hub and with the ears projecting from the top end of the hub and lying in planes substantially parallel to and at opposite sides of the axis of the hub; characterized by the fact that said yoke comprises an integral body of forged metal having a forged recess in the top end of the hub between the roots of the ears, and further characterized by the fact that the roots of the ears extend in curvilinear fashion between the hub and the ears and by the fact that said curvilinear roots also include forged metal from the recess, and include the original grain flow of the metal displaced laterally from the recess in the hub; whereby said roots of the ears include said forge worked displaced metal and that the grain flow extends in curvilinear continuous fashion between the ears and through the curvilinear roots including the laterally displaced metal in the roots of the ears, at both sides of the recess.

3. A universal joint yoke as defined in claim 2, characterized by the fact that the forged body also includes a forged recess in the bottom of the hub and in axial alignment with the forged recess in the top of the hub; wherein the upper portions of the hub and the roots of the ears also include metal displaced from the recess in the bottom of the hub including the original grain flow of said metal; wherein the grain flow of the metal includes continuous grain flow structure extending between the roots of the ears and through the metal of the bottom portion of the hub at both sides of the bottom recess and in curvilinear fashion through all portions of the curvilinear roots of the ear.

References Cited by the Examiner

UNITED STATES PATENTS

| | | | |
|---|---|---|---|
| 1,010,687 | 12/1911 | Redford | 29—551 |
| 1,553,060 | 9/1925 | Anderson. | |
| 1,560,568 | 11/1925 | Haines. | |
| 1,925,721 | 9/1933 | Johnston | 29—551 X |
| 2,120,118 | 6/1938 | Smith | 29—551 |
| 2,502,737 | 4/1950 | Meley et al. | 29—190 |
| 2,686,352 | 8/1954 | Sabo | 29—551 |

DAVID L. RECK, *Primary Examiner.*

HYLAND BIZOT, *Examiner.*